US010237779B2

(12) United States Patent
Ansley

(10) Patent No.: US 10,237,779 B2
(45) Date of Patent: Mar. 19, 2019

(54) IDENTIFYING CONGESTED ACCESS POINTS WITHIN A NETWORK BASED ON MEASURED THROUGHPUT

(71) Applicant: ARRIS Enterprises LLC, Suwanee, GA (US)

(72) Inventor: Carol J. Ansley, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 44 days.

(21) Appl. No.: 15/466,943

(22) Filed: Mar. 23, 2017

(65) Prior Publication Data

US 2017/0280349 A1 Sep. 28, 2017

Related U.S. Application Data

(60) Provisional application No. 62/311,991, filed on Mar. 23, 2016.

(51) Int. Cl.
| | |
|---|---|
| *H04W 28/02* | (2009.01) |
| *H04L 12/26* | (2006.01) |
| *H04W 24/08* | (2009.01) |
| H04W 88/08 | (2009.01) |
| H04W 28/08 | (2009.01) |
| H04W 36/22 | (2009.01) |

(52) U.S. Cl.
CPC ..... *H04W 28/0284* (2013.01); *H04L 43/0888* (2013.01); *H04L 43/16* (2013.01); *H04W 24/08* (2013.01); *H04W 28/08* (2013.01); *H04W 36/22* (2013.01); *H04W 88/08* (2013.01)

(58) Field of Classification Search
CPC ......... H04W 28/0284; H04W 28/0289; H04W 24/08; H04W 88/08; H04L 43/0888
See application file for complete search history.

(56) References Cited

U.S. PATENT DOCUMENTS

| | | | | |
|---|---|---|---|---|
| 9,461,903 B2 * | 10/2016 | Kojima | ............... | H04L 43/0888 |
| 2006/0218264 A1 * | 9/2006 | Ogawa | ................... | H04L 47/10 |
| | | | | 709/223 |
| 2013/0170435 A1 * | 7/2013 | Dinan | ..................... | H04L 45/50 |
| | | | | 370/328 |

* cited by examiner

*Primary Examiner* — Wei Zhao
(74) *Attorney, Agent, or Firm* — Bart A. Perkins

(57) ABSTRACT

Methods, systems, and computer readable media can be operable to facilitate network access management based on measured throughput. In embodiments, throughput at one or more stations or bands of an access point may be monitored and various statistics associated with the monitored throughput may be calculated. Throughput at the stations or bands may be tracked over different durations and the monitored throughput may be compared to average throughputs observed for the stations or bands. The various throughput statistics may be analyzed to make a determination whether throughput at the stations or bands is decreasing and whether current throughput is less than an average throughput observed for the respective stations or bands. If the determination is made that throughput is decreasing and is below average throughput, one or more stations may be moved from a congested access point or band to an alternate access point or band.

17 Claims, 5 Drawing Sheets

IDENTIFYING CONGESTED ACCESS POINTS WITHIN A NETWORK BASED ON MEASURED THROUGHPUT

CROSS REFERENCE TO RELATED APPLICATION

This application is a non-provisional application claiming the benefit of U.S. Provisional Application Ser. No. 62/311,991, entitled "Identifying Congested Access Points within a Network based on Measured Throughput," which was filed on Mar. 23, 2016, and is incorporated herein by reference in its entirety.

TECHNICAL FIELD

This disclosure relates to the identification of congested access points within a network based on measured throughput.

BACKGROUND

In a wide area network (WAN) that hosts multiple wireless access points, limited information may be available from the access points. The access points may not expose low level information to the host network dealing with the radio frequency characteristics, or the connected stations. However, the WAN manager may still want to estimate the level of usage of individual access points to determine if they need to be augmented or replaced. Therefore, a need exists for improving methods and systems for monitoring usage of access points and managing network access based on the monitored usage.

BRIEF DESCRIPTION OF THE DRAWINGS

Like reference numbers and designations in the various drawings indicate like elements.

DETAILED DESCRIPTION

Figure 1:
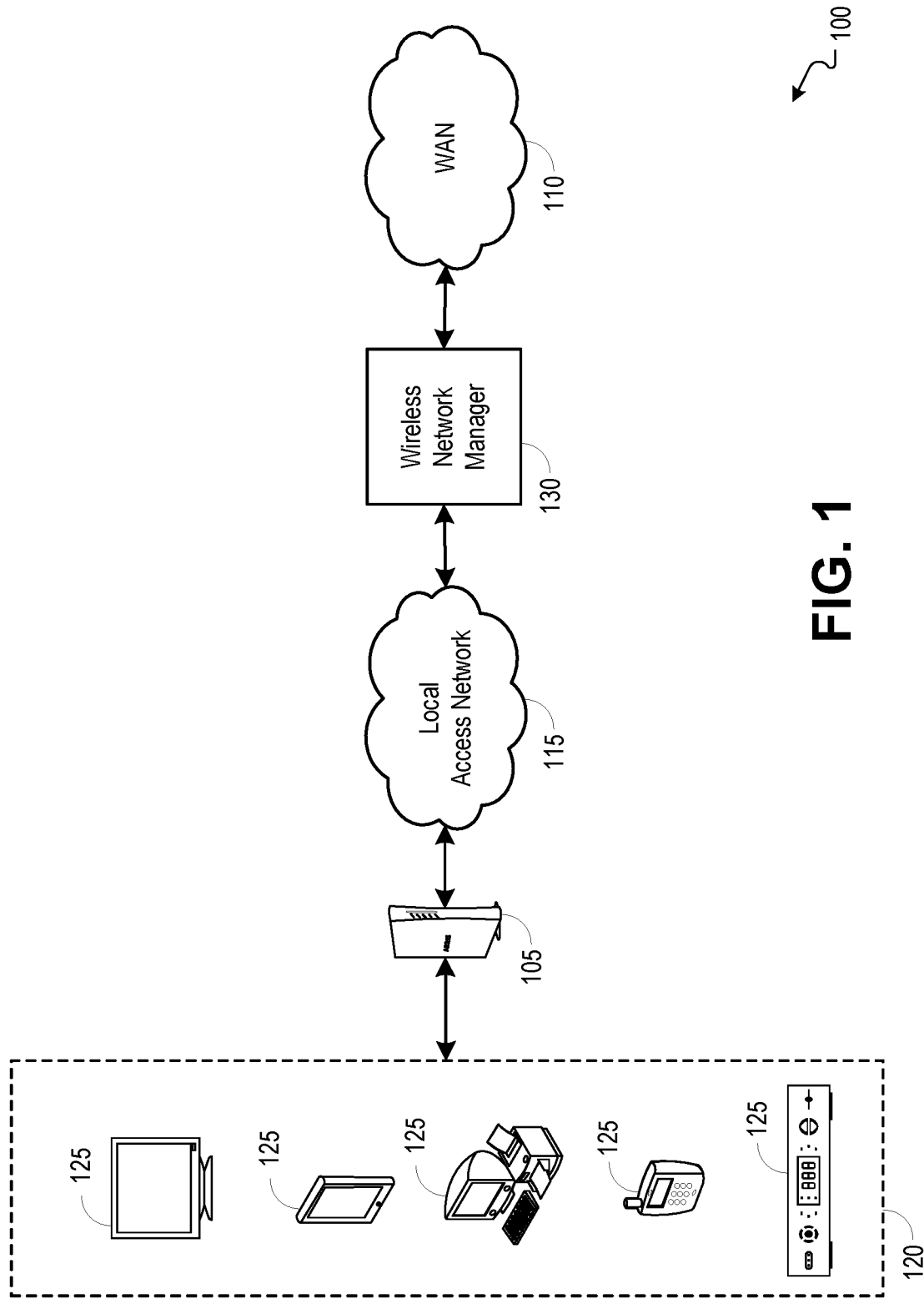
FIG. 1 is a block diagram illustrating an example network environment operable to facilitate network access management based on measured throughput.

It is desirable to improve upon methods and systems for monitoring access point usage and managing network access based on the monitored usage. Methods, systems, and computer readable media can be operable to facilitate network access management based on measured throughput. In embodiments, throughput at one or more stations or bands of an access point may be monitored and various statistics associated with the monitored throughput may be calculated. Throughput at the stations or bands may be tracked over different durations and the monitored throughput may be compared to average throughputs observed for the stations or bands. The various throughput statistics may be analyzed to make a determination whether throughput at the stations or bands is decreasing and whether current throughput is less than an average throughput observed for the respective stations or bands. If the determination is made that throughput is decreasing and is below average throughput, one or more stations may be moved from a congested access point or band to an alternate access point or band.

Most wireless stations do not provide useful information back to their access points, not to mention the larger home networking infrastructure. Without direct input from stations, a controller that wants to make decisions about how to allocate scarce resources, like Wi-Fi airtime or channels, is forced to fall back on information that is locally available. If some or all of the access points also do not provide useful information for a controller, other information must be found to enable effective network management. One piece of information that is typically available at a router level is the actual data that successfully passed from a station up to the local router and the actual data that the router has successfully sent to an access point for a station.

Many traditional enterprise wireless solutions have low level access to access point wireless characteristics and client data because of low level integration with customized access points. Described herein is a use of an algorithm that facilitates support of varied access points, wherein the access points may not provide detailed information to a WAN management system.

An embodiment of the invention described herein may include a method comprising: (a) determining throughput statistics for a first band of a first access point, the throughput statistics comprising: (i) throughput for a current period of time having a first duration; (ii) throughput for a current period of time having a second duration; (iii) an average throughput for one or more past periods of time having the first duration; and (iv) an average throughput for one or more past periods of time having the second duration; (b) based on the throughput statistics, determining whether throughput is decreasing at the first band and whether a current throughput at the first band is less than an average throughput at the first band by a threshold margin; and (c) if the determination is made that throughput is decreasing and that current throughput is less than an average throughput for the first band of the first access point, moving one or more stations from the first band of the first access point to an alternate band.

According to an embodiment of the invention, the first duration is a shorter duration of time than the second duration.

According to an embodiment of the invention, the threshold margin comprises two standard deviations of the average throughput at the first band.

According to an embodiment of the invention, the alternate band is selected from one or more alternate bands that are determined to have sufficient capacity to absorb traffic from one or more of the stations associated with the first band of the first access point.

According to an embodiment of the invention, the one or more alternate bands are determined to have sufficient capacity to absorb traffic from one or more of the stations associated with the first band of the first access point based upon data identifying a maximum number of stations and maximum throughput experienced by each respective alternate band prior to a recognition of a congestion situation at the respective alternate band.

According to an embodiment of the invention, the one or more stations moved from the first band of the first access point to the alternate band comprise one or more of the worst performing stations of the stations associated with the first band of the first access point.

According to an embodiment of the invention, the alternate band comprises a second band of the first access point.

According to an embodiment of the invention, the alternate band comprises a band of a second access point.

An embodiment of the invention described herein may include an apparatus comprising: (a) one or more modules configured to: (i) for each respective station of one or more stations associated with a first band of a first access point, determine throughput statistics, the throughput statistics comprising: (1) throughput for a current period of time having a first duration; (2) throughput for a current period of time having a second duration; (3) an average throughput for one or more past periods of time having the first duration; and (4) an average throughput for one or more past periods of time having the second duration; (ii) based on the throughput statistics for each respective station of the one or more stations, determine whether throughput is decreasing at the respective station and whether a current throughput at the respective station is less than an average throughput at the respective station by a threshold margin; and (iii) if the determination is made that throughput is decreasing and that current throughput is less than an average throughput for more than a threshold number of stations associated with the first band of the first access point, move one or more of the stations from the first band of the first access point to an alternate band.

According to an embodiment of the invention, the first duration is a shorter duration of time than the second duration.

According to an embodiment of the invention, the threshold margin comprises two standard deviations of the average throughput at the respective station.

According to an embodiment of the invention, the one or more stations moved from the first band of the first access point to the alternate band comprise one or more of the worst performing stations of the stations associated with the first band of the first access point.

According to an embodiment of the invention, the alternate band comprises a second band of the first access point.

According to an embodiment of the invention, the alternate band comprises a band of a second access point.

An embodiment of the invention described herein may include one or more non-transitory computer readable media having instructions operable to cause one or more processors to perform the operations comprising: (a) for each respective station of one or more stations associated with a first band of a first access point, determining throughput statistics, the throughput statistics comprising: (i) throughput for a current period of time having a first duration; (ii) throughput for a current period of time having a second duration; (iii) an average throughput for one or more past periods of time having the first duration; and (iv) an average throughput for one or more past periods of time having the second duration; (b) based on the throughput statistics for each respective station of the one or more stations, determining whether throughput is decreasing at the respective station and whether a current throughput at the respective station is less than an average throughput at the respective station by a threshold margin; and (c) if the determination is made that throughput is decreasing and that current throughput is less than an average throughput for more than a threshold number of stations associated with the first band of the first access point, moving one or more of the stations from the first band of the first access point to an alternate band.

According to an embodiment of the invention, the first duration is a shorter duration of time than the second duration.

According to an embodiment of the invention, the alternate band is selected from one or more alternate bands that are determined to have sufficient capacity to absorb traffic from one or more of the stations associated with the first band of the first access point.

According to an embodiment of the invention, the one or more stations moved from the first band of the first access point to the alternate band comprise one or more of the worst performing stations of the stations associated with the first band of the first access point.

According to an embodiment of the invention, the alternate band comprises a second band of the first access point.

According to an embodiment of the invention, the alternate band comprises a band of a second access point.

FIG. 1 is a block diagram illustrating an example network environment 100 operable to facilitate network access management based on measured throughput. In embodiments, an access point 105 may provide video, audio and/or data services to a subscriber by communicating with a wide area network (WAN) 110 through a connection to a local access network 115 (e.g., hybrid fiber-coaxial network, fiber network, cellular network, high speed data network, etc.). The access point 105 may include a gateway device, a broadband modem, a wireless router including an embedded modem, or any other device or access point operable to route communications between one or more client devices and a network. The access point 105 may provide a local wireless network 120 for delivering services to one or more client devices 125. The local wireless network 120 may include a local area network (LAN), wireless local area network (WLAN), personal area network (PAN), mobile hotspot network, and others.

A subscriber can request, receive and interact with multimedia and/or data services through a client device 125. A client device 125 may include a set-top box (STB), computer, mobile device, tablet, television, and any other device operable to receive multimedia and/or data services. Multimedia and/or data services may be received at a client device 125 through a connection to an access point 105. It should be understood that a television may receive multimedia and/or data services through a connection to an access point 105 and/or a STB. While the components shown in FIG. 1 are shown separate from each other, it should be understood that the various components can be integrated into each other.

The local wireless network 120 may be a WLAN provided for client devices 125 within range of the access point 105 (or within range of a wireless extender configured to route communications between the access point 105 and client devices 125), and multimedia and/or data services may be provided to client devices 125 through wireless communications (e.g., Wi-Fi). In embodiments, an access point 105 may provide a single radio band interface (e.g., 2.4 GHz, 5 GHz, etc.) for passing wireless communications between the access point 105 and one or more stations (e.g., client devices 125). Alternatively, an access point 105 may support more than one radio band interface. For example, an access point 105 that supports both a 2.4 GHz interface as well as a 5 GHz interface simultaneously is referred to as a dual band concurrent access point. When a band provided by an access point 105 becomes congested to a certain point, client devices 125 generally receive and transmit communications at a lower bit rate.

In embodiments, a wireless network manager 130 may monitor ingress/egress data rates for each of one or more access points 105, and based on the ingress/egress data rates, the wireless network manager 130 may estimate whether an access point's 105 bandwidth is close to exhaustion or if the access point 105 is trying to serve too many nodes (e.g., stations such as client devices 125). Throughput of an access point 105 may be analyzed to track the WLAN (e.g., Wi-Fi) performance of the access point 105. Typically, the throughput of an access point 105 will vary from moment to moment, but if the throughout is integrated and averaged over longer durations, such as 1-5 minutes, then trends may be seen. The wireless network manager 130 may be placed in the overall network so that all traffic from access point 105 passes through the wireless network manager 130 so that the wireless network manager 130 can inspect the traffic to measure or estimate the traffic rates to and from the access point 105. In other embodiments, the wireless network manager 130 may retrieve the data rate information indirectly by querying one or more access points 105. In other embodiments, the wireless network manager 130 may retrieve the data rate information by querying network routers or other devices that could report data rate information referenced to particular access points 105.

As an example, an access point 105 may be identified as struggling if throughput at the access point 105 drops and then plateaus for sizable periods of time (e.g., 30 seconds or more). An algorithm described herein may be used to monitor and compare the throughputs of an access point 105 observed over time (e.g., from day to day and/or week to week). An access point 105 that is either trying to pass too much traffic or has accumulated too many stations (e.g., client devices 125) may have reduced throughput compared to throughput experienced during previous days or weeks.

In embodiments, an access point 105 may be configured to receive instructions or commands for moving one or more stations (e.g., client device 125) from one band to another band of the access point 105, or to push one or more stations from the access point 105 to another access point 105. In embodiments, the wireless network manager 130 may instruct the access point 105 as to the movement of one or more stations from one access point or band to another access point or band. The wireless network manager 130 may retrieve information identifying a specific access point and/or band on which one or more stations are currently active. In embodiments, an individual band may be partitioned into separate VLANs (virtual local area networks) so that station activity may be tracked per band. In other embodiments, the traffic from one or more stations active on an access point 105 may be tunneled using other protocols that obscure the station information from the WAN.

In embodiments, an access point 105 may monitor communications transmitted to and received from individual stations (e.g., client devices 125). Based on the monitored communications, various statistics associated with communications passed between the access point 105 and the stations may be calculated. It should be understood that the statistics may be calculated by the access point 105, and the calculated statistics may be passed upstream to the wireless network manager 130, or the raw data recovered from monitoring the communications between the access point 105 and stations may be passed upstream to the wireless network manager 130, and the wireless network manager 130 may calculate the various statistics. As an example, the various statistics calculated based on the monitoring of communications between an access point 105 and each station may include: the number of bytes successfully sent to the station over a most recent first duration (e.g., a short duration such as a duration of 5 seconds); the number of bytes successfully received from the station over a most recent first duration (e.g., a short duration such as a duration of 5 seconds); the number of bytes successfully sent to the station over a most recent second duration (e.g., the second duration may be a longer duration than the first duration such as 30 seconds); the number of bytes successfully received from the station over a most recent second duration (e.g., the second duration may be a longer duration than the first duration such as 30 seconds); an average number of bytes successfully sent to the station during a window of the first duration during which the station was active (e.g., this may be a range of values relating to the station's average RSSI (received signal strength indicator)); a standard deviation of the average number of bytes successfully sent to the station during a window of the first duration during which the station was active; an average number of bytes successfully received from the station during a window of the first duration during which the station was active (e.g., this may be a range of values relating to the station's average RSSI); a standard deviation of the average number of bytes successfully received from the station during a window of the first duration during which the station was active; an average number of bytes successfully sent to the station during a window of the second duration during which the station was active (e.g., this may be a range of values relating to the station's average RSSI); a standard deviation of the average number of bytes successfully sent to the station during a window of the second duration during which the station was active; an average number of bytes successfully received from the station during a window of the second duration during which the station was active (e.g., this may be a range of values relating to the station's average RSSI); a standard deviation of the average number of bytes successfully received from the station during a window of the second duration during which the station was active; and/or others.

In the example statistics described herein, the example first duration of 5 seconds and example second duration of 30 seconds are based on typical video GoP (group of pictures) sizes of 2-5 seconds. It will be appreciated by those skilled in the relevant art that other durations might be used depending upon the traffic patterns of the data used by the station.

In embodiments, the wireless network manager 130 may identify a scenario wherein moving a station to a different access point and/or band may be advantageous. For example, a transition of a station from one access point or band to another may be effectuated when a decrease in transmission and/or reception rates is seen from the first duration to the second duration and when transmission and/or reception rates are below a corresponding average by a threshold amount (e.g., by at least two standard deviations). If the transmission and/or reception rates are decreasing and the current transmission and/or reception rates are well below the corresponding averages, the wireless network manager 130 may determine that a congestion situation likely exists at the monitored band of the access point 105. When a congestion situation is recognized, the wireless network manager 130 may determine whether other access points and/or bands are available for use by one or more of the monitored stations, and the wireless network manager 130 may determine whether the other access points and/or bands are likely to have sufficient capacity to absorb the traffic rates from these stations. For example, the wireless network manager 130 may check the historical net throughput and station carrying capacity of the other access points and/or bands. The historical station carrying capacity of an access point or band may be retrieved from a database that includes data identifying a maximum number of clients and maximum transmission/reception rates experienced by an access point and/or band just prior to a recognition of a congestion situation at the access point and/or band. If one or more other access points or bands are identified for use by one or more stations currently using the monitored band, the wireless network manager 130 may direct the monitored access point 105 to move one or more of the worst performing stations to one or more of the other access points and/or bands identified for use by the stations.

In embodiments where per station information is not readily available, the wireless network manager 130 may evaluate an overall performance of an access point 105 using traffic patterns of a band of the access point 105. The wireless network manager 130, as described earlier, may calculate the various statistics associated with transmission and/or reception rates over a specific band of the access point 105 or the wireless network manager 130 may retrieve those statistics from an intermediate router, or directly from the router itself. As an example, the various statistics calculated based on the monitoring of traffic over a specific band of the access point 105 may include: the number of bytes successfully sent to the band over a most recent first duration (e.g., a short duration such as a duration of 5 seconds); the number of bytes successfully received from the band over a most recent first duration (e.g., a short duration such as a duration of 5 seconds); the number of bytes successfully sent to the band over a most recent second duration (e.g., the second duration may be a longer duration than the first duration such as 30 seconds); the number of bytes successfully received from the band over a most recent second duration (e.g., the second duration may be a longer duration than the first duration such as 30 seconds); an average number of bytes successfully sent to the band during a window of the first duration (e.g., this may be a range of values describing the average throughput of the band during certain times of day or other quantifiable time periods); a standard deviation of the average number of bytes successfully sent to the band during a window of the first duration; an average number of bytes successfully received from the band during a window of the first duration (e.g., this may be a range of values describing the average throughput of the band during certain times of day or other quantifiable time periods); a standard deviation of the average number of bytes successfully received from the band during a window of the first duration; an average number of bytes successfully sent to the band during a window of the second duration (e.g., this may be a range of values describing the average throughput of the band during certain times of day or other quantifiable time periods); a standard deviation of the average number of bytes successfully sent to the band during a window of the second duration; an average number of bytes successfully received from the band during a window of the second duration (e.g., this may be a range of values describing the average throughput of the band during certain times of day or other quantifiable time periods); a standard deviation of the average number of bytes successfully received from the band during a window of the second duration; and/or others.

In embodiments, the wireless network manager 130 may identify a scenario wherein moving a station to a different access point and/or band may be advantageous. For example, a transition of a station from one band to another may be effectuated when a decrease in transmission and/or reception rates along the band is seen from the first duration to the second duration and when transmission and/or reception rates are below a corresponding average by a threshold amount (e.g., by at least two standard deviations). If the transmission and/or reception rates are decreasing and the current transmission and/or reception rates are well below the corresponding averages, the wireless network manager 130 may determine that a congestion situation likely exists at the monitored band of the access point 105. When a congestion situation is recognized, the wireless network manager 130 may determine whether other access points and/or bands are available for use by one or more of stations using the monitored band, and the wireless network manager 130 may determine whether the other access points and/or bands are likely to have sufficient capacity to absorb the traffic rates from these stations. For example, the wireless network manager 130 may check the historical net throughput and station carrying capacity of the other access points and/or bands. The historical station carrying capacity of an access point or band may be retrieved from a database that includes data identifying a maximum number of clients and maximum transmission/reception rates experienced by an access point and/or band just prior to a recognition of a congestion situation at the access point and/or band. If one or more other access points or bands are identified for use by one or more stations currently using the monitored band, the wireless network manager 130 may direct the monitored access point 105 to move one or more of the worst performing stations (e.g., the station(s) exhibiting the highest discrepancy between throughput measured over the first duration and throughput measured over the second duration, the station(s) exhibiting the highest discrepancy between current throughput and average of previously measured throughput, etc.) to one or more of the other access points and/or bands identified for use by the stations. If the wireless network manager 130 cannot directly instruct the access points to reconfigure to move stations to a better configuration, the wireless network manager 130 can raise an alarm to a higher network management entity. For example, if the determination is made that there are too many clients or too much traffic for all network elements to achieve a desired level of performance, the only option may be to notify a higher level management entity that there is a congestion situation that can only be resolved by higher level actions, such as directing a group of users to be disconnected.

Figure 2:
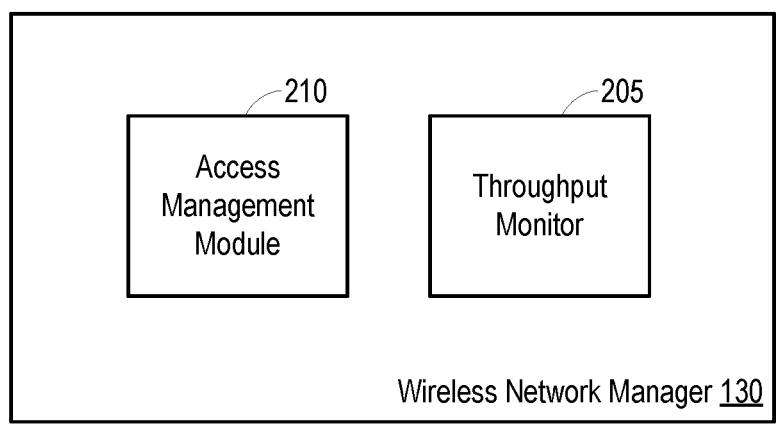
FIG. 2 is a block diagram illustrating an example wireless network manager operable to facilitate network access management based on measured throughput.

FIG. 2 is a block diagram illustrating an example wireless network manager 130 operable to facilitate network access management based on measured throughput. The wireless network manager 130 may include a throughput monitor 205 and an access management module 210.

In embodiments, a throughput monitor 205 may monitor ingress/egress data rates for each of one or more access points (e.g., access point 105 of FIG. 1), and based on the ingress/egress data rates, the throughput monitor 205 may estimate whether an access point's bandwidth is close to exhaustion or if the access point is trying to serve too many nodes (e.g., stations such as client devices 125 of FIG. 1).

In embodiments, the throughput monitor 205 may retrieve various statistics associated with communications passed between an access point and one or more stations, wherein the statistics are calculated based upon a monitoring of the communications passed between the access point and the stations. It should be understood that the statistics may be calculated by the access point, and the calculated statistics may be passed upstream to the throughput monitor 205, or the raw data recovered from monitoring the communications between the access point and stations may be passed upstream to the throughput monitor 205, and the throughput monitor 205 may calculate the various statistics. As an example, the various statistics calculated based on the monitoring of communications between an access point and each station may include transmission and reception rates of communications passed between the access point and one or more stations during certain durations of time (e.g., a first duration, a second duration, etc.). The statistics may include average throughputs of communication transmissions and receptions between the access point and stations.

In embodiments, the throughput monitor 205 may identify a scenario wherein moving a station to a different access point and/or band may be advantageous. For example, a transition of a station from one access point or band to another may be effectuated when a decrease in transmission and/or reception rates is seen from a first duration to a second duration and when transmission and/or reception rates are below a corresponding average by a threshold amount (e.g., by at least two standard deviations). If the transmission and/or reception rates are decreasing and the current transmission and/or reception rates are well below the corresponding averages, the throughput monitor 205 may determine that a congestion situation likely exists at the monitored band of the access point. When a congestion situation is recognized, the access management module 210 may determine whether other access points and/or bands are available for use by one or more of the monitored stations, and the access management module 210 may determine whether the other access points and/or bands are likely to have sufficient capacity to absorb the traffic rates from these stations. For example, the access management module 210 may check the historical net throughput and station carrying capacity of the other access points and/or bands. If one or more other access points or bands are identified for use by one or more stations currently using the monitored band, the access management module 210 may direct the monitored access point to move one or more of the worst performing stations to one or more of the other access points and/or bands identified for use by the stations.

In embodiments where per station information is not readily available, the throughput monitor 205 may evaluate an overall performance of an access point using traffic patterns of a band of the access point. The throughput monitor 205 may retrieve various statistics associated with transmission and/or reception rates over a specific band of the access point. It should be understood that the statistics may be calculated by the access point, and the calculated statistics may be passed upstream to the throughput monitor 205, or the raw data recovered from monitoring the communications over the band of the access point may be passed upstream to the throughput monitor 205, and the throughput monitor 205 may calculate the various statistics. As an example, the various statistics calculated based on the monitoring of communications passed over the band of the access point may include transmission and reception rates of communications passed over the band of the access point during certain durations of time (e.g., a first duration, a second duration, etc.). The statistics may include average throughputs of communication transmissions and receptions over the band of the access point.

In embodiments, the throughput monitor 205 may identify a scenario wherein moving a station to a different access point and/or band may be advantageous. For example, a transition of a station from one band to another may be effectuated when a decrease in transmission and/or reception rates along the band is seen from the first duration to the second duration and when transmission and/or reception rates are below a corresponding average by a threshold amount (e.g., by at least two standard deviations). If the transmission and/or reception rates are decreasing and the current transmission and/or reception rates are well below the corresponding averages, the throughput monitor 205 may determine that a congestion situation likely exists at the monitored band of the access point. When a congestion situation is recognized, the access management module 210 may determine whether other access points and/or bands are available for use by one or more of stations using the monitored band, and the access management module 210 may determine whether the other access points and/or bands are likely to have sufficient capacity to absorb the traffic rates from these stations. For example, the access management module 210 may check the historical net throughput and station carrying capacity of the other access points and/or bands. If one or more other access points or bands are identified for use by one or more stations currently using the monitored band, the access management module 210 may direct the monitored access point to move one or more of the worst performing stations to one or more of the other access points and/or bands identified for use by the stations. If the access management module 210 cannot direct the access point to move a station, the access management module 210 may notify a WAN router element that one or more tunnels or VLANs should be rate-limited or halted to encourage those devices to seek another access point or band.

Figure 3:
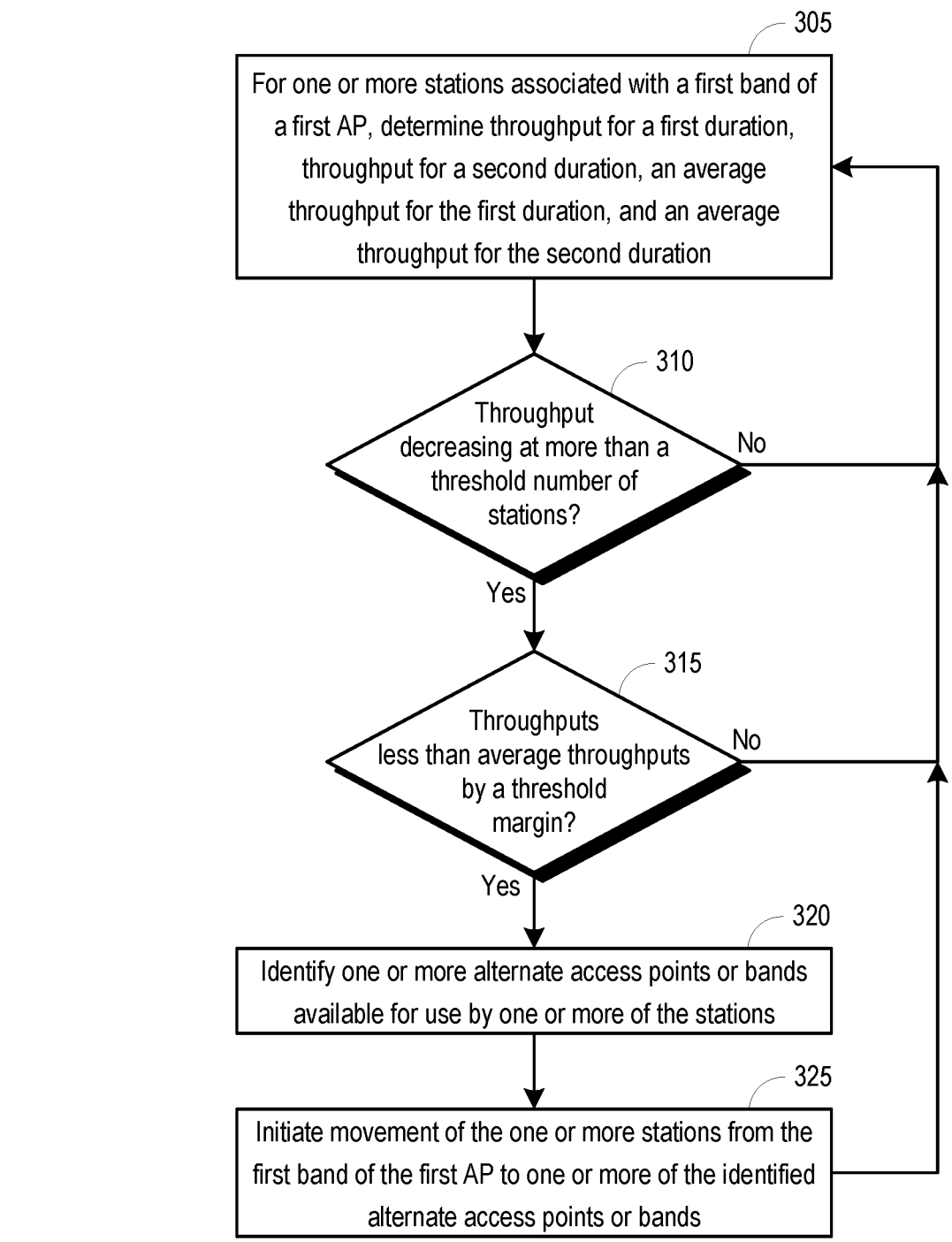
FIG. 3 is a flowchart illustrating an example process operable to facilitate network access management based on measured throughput at one or more stations associated with a band of an access point.

FIG. 3 is a flowchart illustrating an example process 300 operable to facilitate network access management based on measured throughput at one or more stations associated with a band of an access point. The process 300 may be carried out by a wireless network manager 130 of FIG. 1. It should be understood that the process 300 may be carried out continuously, periodically, or conditionally. The process 300 may begin at 305 where throughput statistics are determined for one or more stations associated with a first band of a first access point. The throughput statistics may include throughput for a first duration (e.g., bytes successfully sent to and/or received from a station during a first duration, wherein the first duration is a short duration of, for example, five seconds or other short duration), throughput for a second duration (e.g., bytes successfully sent to and/or received from a station during a second duration, wherein the second duration is a duration of time that is longer than the first duration, for example, thirty seconds or other longer duration), an average throughput for the first duration (e.g., average number of bytes successfully sent to and/or received from the station over a window of the first duration when the station was active), and an average throughput for the second duration (e.g., average number of bytes successfully sent to and/or received from the station over a window of the second duration when the station was active). The throughput statistics may be determined or retrieved, for example, by a throughput monitor 205 of FIG. 2. In embodiments, the throughput statistics may be determined based upon monitored transmission rates of communications passed between the first access point (e.g., access point 105 of FIG. 1) and each of one or more stations (e.g., client devices 125 of FIG. 1) communicating with the access point over the first band. The transmission rates may be determined by deep packet inspection of traffic by the wireless manager, for example, or on the WAN. In addition to or in lieu of the measurement of individual stations, throughput of individual VLANs or tunnels may be tracked as a substitute for the ability to track individual stations.

At 310, a determination may be made whether throughput is decreasing at more than a threshold number of stations. The determination whether throughput is decreasing at more than a threshold number of stations may be made, for example, by a throughput monitor 205 of FIG. 2. In embodiments, a bitrate of communications sent to and/or received from a station over a most recent first duration (e.g., 5 second duration or other short duration) may be compared to a bitrate of communications sent to and/or received from the station over a most recent second duration (e.g., longer duration such as 30 seconds). If the bitrate of communications sent to and/or received from the station over the first duration is less than the bitrate of communications sent to and/or received from the station over the second duration, then the throughput monitor 205 may determine that throughput is decreasing at the station. If the determination is made that throughput is not decreasing at more than a threshold number of stations that are communicating over the first band of the first access point, the process 300 may return to 305.

If, at 310, the determination is made that throughput is decreasing at more than a threshold number of stations that are communicating over the first band of the first access point, the process 300 may proceed to 315. At 315, a determination may be made whether the measured throughputs are less than average throughputs by a threshold margin. The determination whether the measured throughputs are less than average throughputs by a threshold margin may be made, for example, by a throughput monitor 205 of FIG. 2. In embodiments, the throughput monitor 205 may calculate a standard deviation for the average bitrate of communications sent to and/or received from each station, and the threshold margin may be based upon the calculated standard deviation. For example, the threshold margin may be two standard deviations of the corresponding average bitrate. If the determination is made that the measured throughputs are not less than average throughputs by the threshold margin, the process 300 may return to 305.

If, at 315, the determination is made that the measured throughputs are less than average throughputs by the threshold margin, the process 300 may proceed to 320. At 320, one or more alternate access points or bands available for use by one or more of the stations currently using the first band of the first access point may be identified. The one or more alternate access points or bands may be identified, for example, by an access management module 210 of FIG. 2. In embodiments, the access management module 210 may retrieve information identifying one or more access points or bands that are available for use by one or more of the stations currently using the first band of the first access point. The access management module 210 may identify one or more of the alternate access points or bands that has the resource capacity to support the addition of one or more stations that are currently using the first band of the first access point. The access management module 210 may identify one or more of the worst-performing stations as stations to be moved from the first band of the first access point to an alternate access point or band.

At 325, movement of the one or more identified stations from the first band of the first access point to one or more of the identified alternate access points or bands may be initiated. After moving the one or more identified stations from the first band of the first access point to one or more of the identified alternate access points or bands, the process 300 may return to 305.

Figure 4:
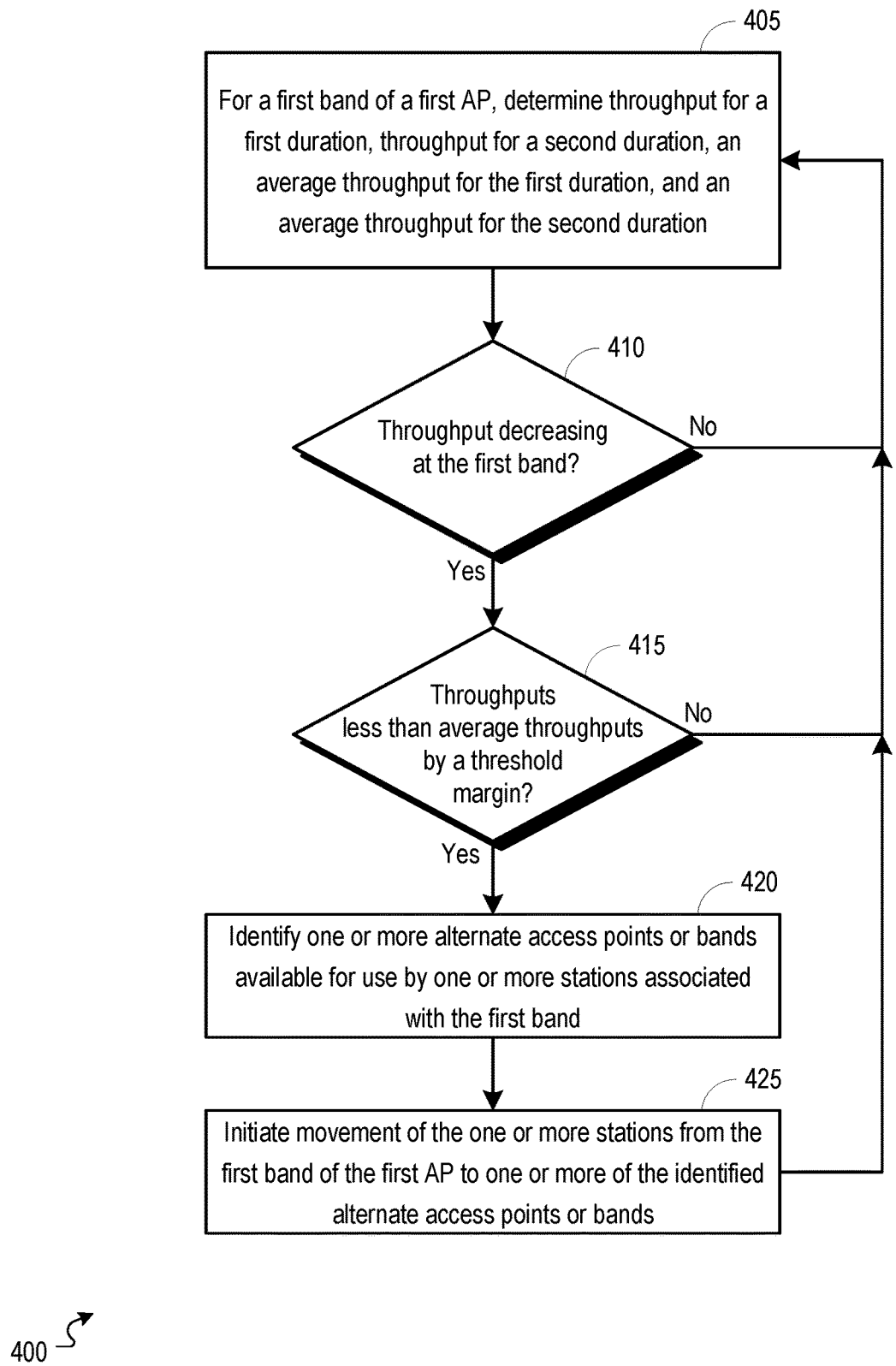
FIG. 4 is a flowchart illustrating an example process operable to facilitate network access management based on measured throughput at a band of an access point.

FIG. 4 is a flowchart illustrating an example process 400 operable to facilitate network access management based on measured throughput at a band of an access point. The process 400 may be carried out by a wireless network manager 130 of FIG. 1. It should be understood that the process 400 may be carried out continuously, periodically, or conditionally. The process 400 may begin at 405 where throughput statistics are determined for a first band of a first access point. The throughput statistics may include throughput for a first duration (e.g., bytes successfully sent to and/or received from the first band during a first duration, wherein the first duration is a short duration of, for example, five seconds or other short duration), throughput for a second duration (e.g., bytes successfully sent to and/or received from the first band during a second duration, wherein the second duration is a duration of time that is longer than the first duration, for example, thirty seconds or other longer duration), an average throughput for the first duration (e.g., average number of bytes successfully sent to and/or received from the first band over a window of the first duration), and an average throughput for the second duration (e.g., average number of bytes successfully sent to and/or received from the first band over a window of the second duration). The throughput statistics may be determined or retrieved, for example, by a throughput monitor 205 of FIG. 2. In embodiments, the throughput statistics may be determined based upon monitored transmission rates of communications passed over the first band.

At 410, a determination may be made whether throughput is decreasing at the first band. The determination whether throughput is decreasing at the first band may be made, for example, by a throughput monitor 205 of FIG. 2. In embodiments, a bitrate of communications sent to and/or received from the first band over a most recent first duration (e.g., 5 second duration or other short duration) may be compared to a bitrate of communications sent to and/or received from the first band over a most recent second duration (e.g., longer duration such as 30 seconds). If the bitrate of communications sent to and/or received from the first band over the first duration is less than the bitrate of communications sent to and/or received from the first band over the second duration, then the throughput monitor 205 may determine that throughput is decreasing at the first band. If the determination is made that throughput is not decreasing at the first band, the process 400 may return to 405.

If, at 410, the determination is made that throughput is decreasing at the first band, the process 400 may proceed to 415. At 415, a determination may be made whether the measured throughputs are less than average throughputs by a threshold margin. The determination whether the measured throughputs are less than average throughputs by a threshold margin may be made, for example, by a throughput monitor 205 of FIG. 2. In embodiments, the throughput monitor 205 may calculate a standard deviation for the average bitrate of communications sent to and/or received from the first band, and the threshold margin may be based upon the calculated standard deviation. For example, the threshold margin may be two standard deviations of the corresponding average bitrate. If the determination is made that the measured throughputs are not less than average throughputs by the threshold margin, the process 400 may return to 405.

If, at 415, the determination is made that the measured throughputs are less than average throughputs by the threshold margin, the process 400 may proceed to 420. At 420, one or more alternate access points or bands available for use by one or more of the stations currently using the first band of the first access point may be identified. The one or more alternate access points or bands may be identified, for example, by an access management module 210 of FIG. 2. In embodiments, the access management module 210 may retrieve information identifying one or more access points or bands that are available for use by one or more of the stations currently using the first band of the first access point. The access management module 210 may identify one or more of the alternate access points or bands that has the resource capacity to support the addition of one or more stations that are currently using the first band of the first access point. The access management module 210 may identify one or more of the worst-performing stations as stations to be moved from the first band of the first access point to an alternate access point or band. Alternatively, if the access point's traffic is partitioned into one or more VLANs or tunnels, the access management module 210 may elect to shut down one or more of the VLANs or tunnels to relieve the congestion. A WAN router or similar device may be notified by the access management module 210 to police the allowed traffic of one or more of the VLANs or tunnels At 425, movement of the one or more identified stations from the first band of the first access point to one or more of the identified alternate access points or bands may be initiated. After moving the one or more identified stations from the first band of the first access point to one or more of the identified alternate access points or bands, the process 400 may return to 405.

Figure 5:
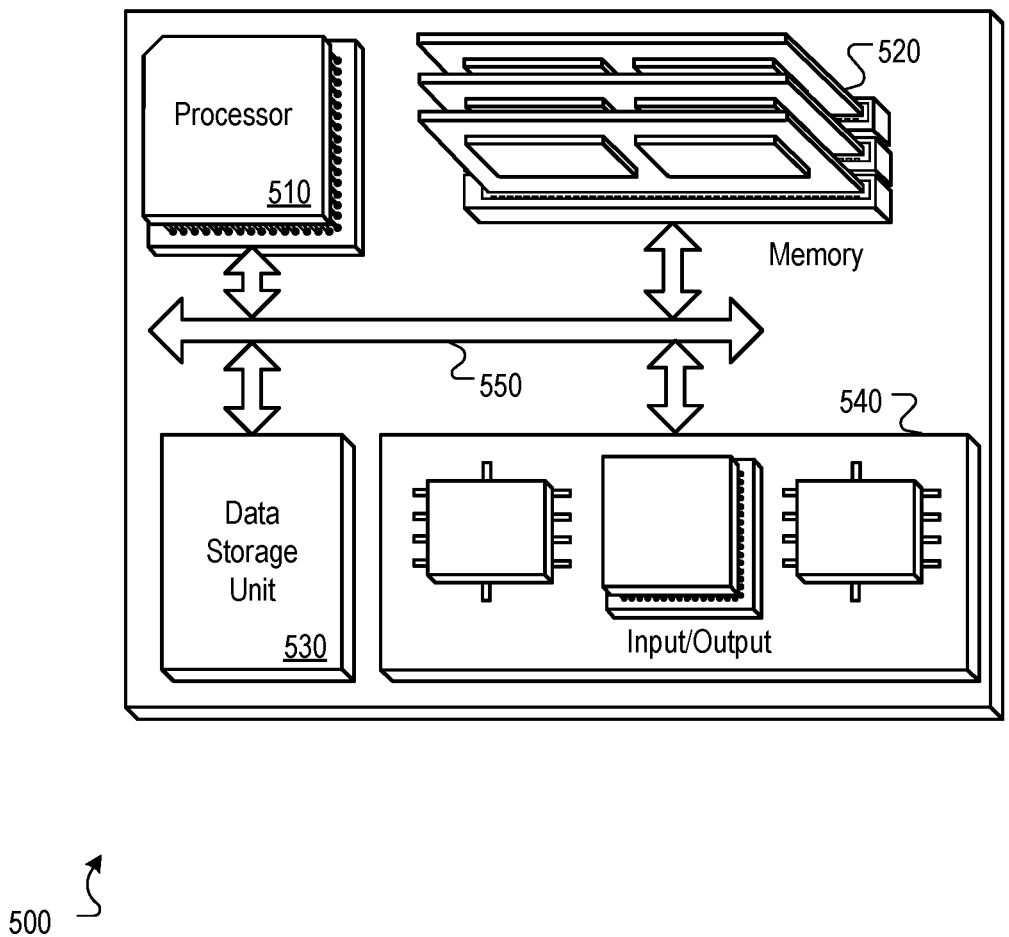
FIG. 5 is a block diagram of a hardware configuration operable to facilitate network access management based on measured throughput.

FIG. 5 is a block diagram of a hardware configuration 500 operable to facilitate network access management based on measured throughput. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 125 of FIG. 1 (e.g., STB, television, computer, tablet, mobile device, etc.). In embodiments, the input/output device can include driver devices configured to send communications to, and receive communications from one or more networks (e.g., local network 120 of FIG. 1, subscriber network 115 of FIG. 1, WAN 110 of FIG. 1, etc.).

Those skilled in the art will appreciate that the invention improves upon methods and systems for monitoring usage of an access point and managing network access based on the monitored usage. Methods, systems, and computer readable media can be operable to facilitate network access management based on measured throughput. In embodiments, throughput at one or more stations or bands of an access point may be monitored and various statistics associated with the monitored throughput may be calculated. Throughput at the stations or bands may be tracked over different durations and the monitored throughput may be compared to average throughputs observed for the stations or bands. The various throughput statistics may be analyzed to make a determination whether throughput at the stations or bands is decreasing and whether current throughput is less than an average throughput observed for the respective stations or bands. If the determination is made that throughput is decreasing and is below average throughput, one or more stations may be moved from a congested access point or band to an alternate access point or band.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   determining throughput statistics for a first band of a first access point, the throughput statistics comprising:
   throughput for a current period of time having a first duration;
   throughput for a current period of time having a second duration, wherein the first duration comprises a shorter duration of time than the second duration;
   an average throughput for one or more past periods of time having the first duration; and
   an average throughput for one or more past periods of time having the second duration;
   comparing the throughput for the current period of time having the first duration to the throughput for the current period of time having the second duration;
   based upon a determination that the throughput for the current period of time having the first duration is less than the throughput for the current period of time having the second duration, determining that throughput is decreasing at the first band;
   in response to the determination that throughput is decreasing at the first band, determining a threshold margin, wherein the threshold margin is determined based upon a calculation of a standard deviation for the average throughputs; and
   based upon a determination that a throughput for a current period of time is less than an average throughput for one or more past periods of time by the threshold margin, moving one or more stations from the first band of the first access point to an alternate band.

2. The method of claim 1, wherein the threshold margin comprises two standard deviations of the average throughput at the first band.

3. The method of claim 1, wherein the alternate band is selected from one or more alternate bands that are determined to have sufficient capacity to absorb traffic from one or more of the stations associated with the first band of the first access point.

4. The method of claim 3, wherein the one or more alternate bands are determined to have sufficient capacity to absorb traffic from one or more of the stations associated with the first band of the first access point based upon data identifying a maximum number of stations and maximum throughput experienced by each respective alternate band prior to a recognition of a congestion situation at the respective alternate band.

5. The method of claim 1, wherein the one or more stations moved from the first band of the first access point to the alternate band comprise one or more stations exhibiting the highest discrepancy between throughput measured over the first duration and throughput measured over the second duration.

6. The method of claim 1, wherein the alternate band comprises a second band of the first access point.

7. The method of claim 1, wherein the alternate band comprises a band of a second access point.

8. An apparatus comprising:
   one or more modules that:
   for each respective station of one or more stations associated with a first band of a first access point, determine throughput statistics, the throughput statistics comprising:
   throughput for a current period of time having a first duration;
   throughput for a current period of time having a second duration, wherein the first duration comprises a shorter duration of time than the second duration;
   an average throughput for one or more past periods of time having the first duration; and
   an average throughput for one or more past periods of time having the second duration;
   compare the throughput for the current period of time having the first duration to the throughput for the current period of time having the second duration;
   based upon a determination that the throughput for the current period of time having the first duration is less than the throughput for the current period of time having the second duration, determine that throughput is decreasing at the first band;

in response to the determination that throughput is decreasing at the first band, determine a threshold margin, wherein the threshold margin is determined based upon a calculation of a standard deviation for the average throughputs; and based upon a determination that a throughput for a current period of time is less than an average throughput for one or more past periods of time by the threshold margin, move one or more of the stations from the first band of the first access point to an alternate band.

9. The apparatus of claim 8, wherein the threshold margin comprises two standard deviations of the average throughput at the respective station.

10. The apparatus of claim 8, wherein the one or more stations moved from the first band of the first access point to the alternate band comprise one or more stations exhibiting the highest discrepancy between throughput measured over the first duration and throughput measured over the second duration.

11. The apparatus of claim 8, wherein the alternate band comprises a second band of the first access point.

12. The apparatus of claim 8, wherein the alternate band comprises a band of a second access point.

13. One or more non-transitory computer readable media having instructions operable to cause one or more processors to perform the operations comprising:

for each respective station of one or more stations associated with a first band of a first access point, determining throughput statistics, the throughput statistics comprising:

throughput for a current period of time having a first duration;

throughput for a current period of time having a second duration, wherein the first duration comprises a shorter duration of time than the second duration;

an average throughput for one or more past periods of time having the first duration; and an average throughput for one or more past periods of time having the second duration;

comparing the throughput for the current period of time having the first duration to the throughput for the current period of time having the second duration;

based upon a determination that the throughput for the current period of time having the first duration is less than the throughput for the current period of time having the second duration, determining that throughput is decreasing at the first band;

in response to the determination that throughput is decreasing at the first band, determining a threshold margin, wherein the threshold margin is determined based upon a calculation of a standard deviation for the average throughputs; and based upon a determination that a throughput for a current period of time is less than an average throughput for one or more past periods of time by the threshold margin, moving one or more of the stations from the first band of the first access point to an alternate band.

14. The one or more non-transitory computer-readable media of claim 13, wherein the alternate band is selected from one or more alternate bands that are determined to have sufficient capacity to absorb traffic from one or more of the stations associated with the first band of the first access point.

15. The one or more non-transitory computer-readable media of claim 13, wherein the one or more stations moved from the first band of the first access point to the alternate band comprise one or more stations exhibiting the highest discrepancy between throughput measured over the first duration and throughput measured over the second duration.

16. The one or more non-transitory computer-readable media of claim 13, wherein the alternate band comprises a second band of the first access point.

17. The one or more non-transitory computer-readable media of claim 13, wherein the alternate band comprises a band of a second access point.

* * * * *